May 16, 1950 H. BEIER 2,508,136
MAP HOLDER
Filed Aug. 6, 1945
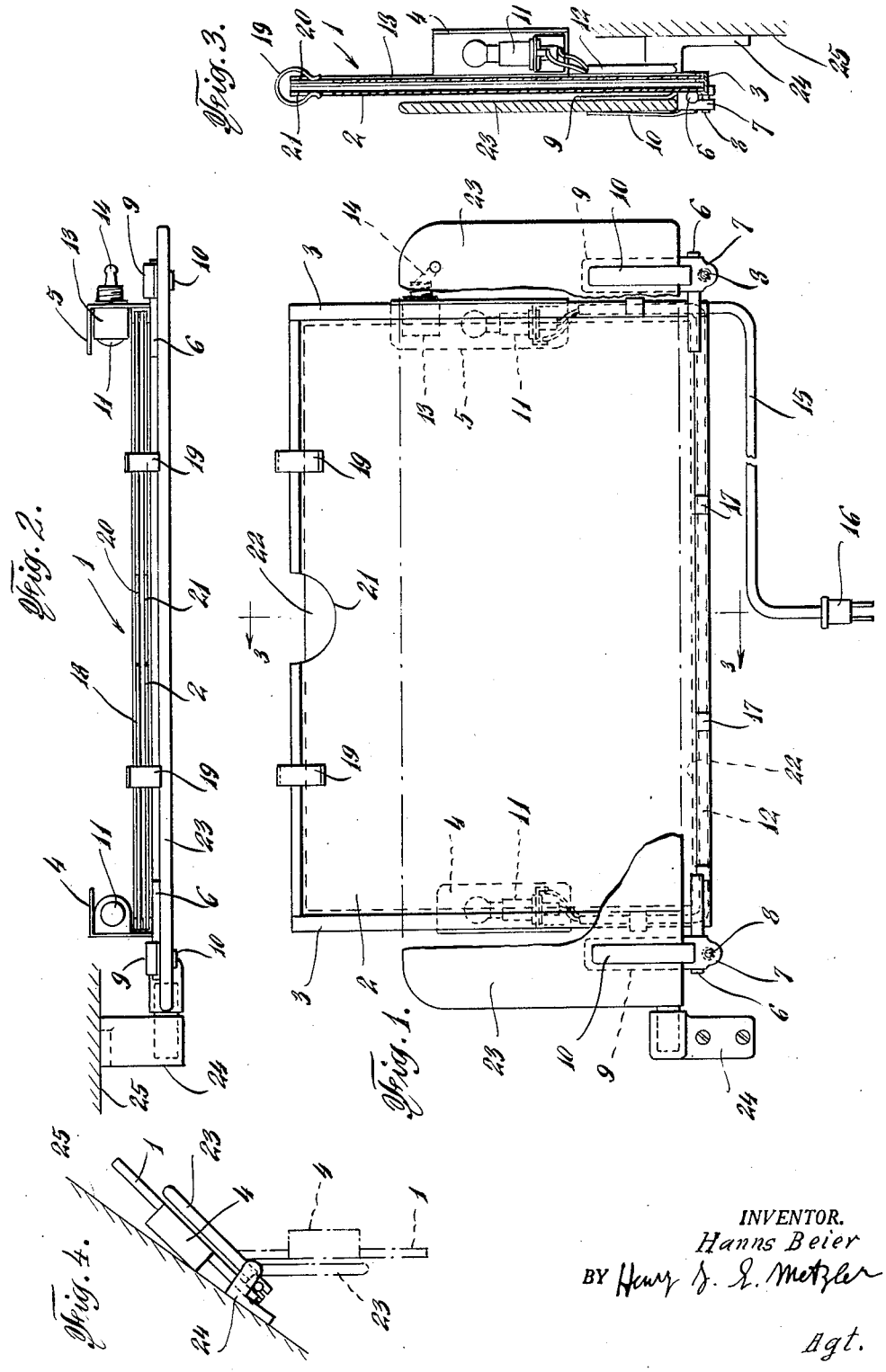
INVENTOR.
Hanns Beier
BY Henry J. E. Metzler
Agt.

Patented May 16, 1950

2,508,136

UNITED STATES PATENT OFFICE 2,508,136

MAP HOLDER

Hanns Beier, New York, N. Y.

Application August 6, 1945, Serial No. 609,257

1 Claim. (Cl. 40—130)

This invention relates to a device designed to be used as a map holder in an automobile or in any similar vehicle.

Persons traveling by automobile ordinarily find it most convenient to orient themselves by reference to road maps. These maps are large, bulky, cumbersome and difficult to fold and unfold. Various types of map holders have been developed, particularly the so-called "Rolled map strip holders" which, however, require special longitudinal maps and which cannot be used for the normal maps such as are distributed by gasoline stations. Most of the hitherto known automobile map holders are intended for being used while driving, thus inducing the driver to consult the map without stopping, which increases the danger of accidents considerably.

It is, therefore, the primary object of the present invention to provide a map holder which is convenient in use, light in weight, which is adapted for being used in connecton with any types of maps, primarily for gasoline station maps, and which can easily be attached to the sunshield of the car in such a manner that it—when the map is consulted—covers a large portion of the windshield so that the driver must stop whenever he uses the map, but which is completely out of the way when not in use, and which can be used at night independently from the arrangement and functioning of the sources of light which are provided in the car itself.

It is another object of the present invention to provide a novel portable map holder or casing in which maps may be compactly carried and of a character such that reference to the map will be easy and convenient.

A further object of the invention is to provide a map holder or casing of the above mentioned character which is simple in construction and inexpensive to manufacture.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings:

Figure 1 is a rear plan view of a preferred embodiment of my invention;

Figure 2 is a top elevational view of the same;

Figure 3 is a section view on the line 3—3 of Fig. 1; and

Figure 4 is a diagrammatical side view of the device as it appears when it is attached to an automobile.

Similar numerals refer to similar parts throughout the several views.

Referring to the drawing the numeral 1 denotes a flat, substantially rectangular casing which consists of a supporting panel 2 of aluminum, sheet metal, plastic material or the like and of a transparent sheet 18 secured to the top and side edges of panel 2 by means of U-shaped members 3 or in any other suitable manner. Reflector shields 4 and 5 and small electric lamps 11 are attached to the side portions of casing 1 and protrude slightly over sheet 18, and recesses 21 are provided in the open portion of the casing 1 and the panel 2 and of sheet 18, respectively for facilitating the inserting of a folded map 22 (or of any other instructive matter) into the casing 1.

In Fig. 1 the device is shown in the position in which it is when not in use. In this positon, the map is upside down, while the device, when in use is in an inverted position relative to that shown in Fig. 1.

In Fig. 4 the position in which the device is when not in use is shown in full lines, while its position when in use is indicated in dash-and-dotted lines. In the following part of this specification the words "top" and "lower" refer to the position of the device indicated in dash-and-dotted line in Fig. 4.

Bolts 6 are extended laterally from two opposite top corner portions of panel 2, and partially slotted blocks 7 are pivotally secured to the bolts 6. A screw 8 passes through the slotted portion of each block 7 (Figs. 1 and 3) so that, by tightening the screws 8, the blocks 7 can be pressed around the bolts 6 so firmly that the casing 1 will not inadvertently change its position relative to the bolts 6. A pair of resilient fingers 9 and 10, or a solid finger 9 and a cooperating resilient finger 10, are carried by each block 7 and are adapted for being clamped upon the sunshield 23 of a vehicle. The sunshield 23 which is not a part of my present invention, is in a well-known manner secured above the windshield (not shown) of the vehicle by means of a bracket 24 or the like. Casing 1, by means of the clamping fingers 9 and 10, is normally detachably attached to the sunshield 23 in such a manner that it—when not in use—is located between the roof 25 of the vehicle and the sunshield 23, as shown in full lines in Fig. 4; thus it is out of the way when not in use. When the sunshield 23 is used alone, it can be swung in the position indicated in dash-and-dotted lines in Fig. 4, while the casing 1 remains in the position shown in full lines. When the map 22 is to be consulted, both the sunshield 23 and casing 1 are swung downwardly as indicated in dash-and-dotted lines in Fig. 4. Since the casing 1 protrudes largely over the sunshield 23, the major portion of the windshield is covered when my device is used, so that the driver will necessarily have to stop for consulting the map and will not be induced to invite accidents by continuing to drive while looking at the map.

The use of my device at night is facilitated by the lamps 11 which are connected to each other and to a switch 13, that is actuated by a lever 14, by means of insulated wires 12 which are secured to the top edge and to portions of the lateral edges of casing 1 by fastening means 17 (Fig. 1). A flexible cable 15 preferably provided with a plug 16 connects the lamps 11 to a source of current.

In order to prevent the map 22 from slipping out of the casing 1, I prefer to use one or more resilient clamps 19 in the manner shown in Figs. 1 to 3, inclusive.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claim.

Having thus described my invention, what I claim and desire to secure by Letters Patent in the United States is:

In a device of the character described, a substantially rectangular supporting panel having a transparent sheet secured to three of its edges in such a manner that a map can be inserted between said supporting panel and said sheet, an electric light bulb and a reflector mounted upon each vertical side portion of said supporting panel and protruding partially over said sheet, a switch controlling both light bulbs and being attached to one of said reflectors, insulated wires connecting said light bulbs to a source of current and to said switch being attached to that horizontal edge of said supporting panel to which said transparent sheet is secured, two bolts laterally extended from the extremities of said last mentioned edge of said supporting panel, a partially slotted block pivotally secured to each of said bolts, a pair of resilient fingers carried by each block and extending beyond each block in a direction opposite to the slotted portion of each block, and a screw passing through the slotted portion of each of said blocks and being adapted for tightening said blocks upon said bolts, said resilient fingers being adapted to engage one of the longer edge portions of a rectangular sunshield which edge portion is hinged to a horizontal rod mounted above a windshield of an automobile in such a manner that the map holder is normally between the sunshield and the roof of the automobile but that the sunshield and the map holder can be swung downwardly.

HANNS BEIER.

REFERENCES CITED

The following references are of record in the file of this patent:

UNITED STATES PATENTS

| Number | Name | Date |
|---|---|---|
| 838,937 | Batchelder | Dec. 18, 1906 |
| 1,554,596 | Ramsey | Sept. 22, 1925 |
| 1,589,136 | Fall | June 15, 1926 |
| 1,607,752 | Higdon | Nov. 23, 1926 |
| 1,730,790 | Squires | Oct. 8, 1929 |
| 1,767,924 | Greene | June 24, 1930 |
| 1,834,260 | Thompson | Dec. 1, 1931 |
| 2,048,105 | Cobbs | July 21, 1936 |
| 2,112,726 | Kemp et al. | Mar. 29, 1938 |
| 2,188,612 | Owen et al. | Jan. 30, 1940 |
| 2,204,691 | Olsen | June 18, 1940 |